Feb. 9, 1960     L. PUCCI     2,924,135
TURNING MACHINE FOR FORMING PISTONS
Filed Sept. 13, 1957     7 Sheets-Sheet 1

INVENTOR.
Lee Pucci
ECKHOFF & SLICK
ATTORNEYS

Feb. 9, 1960 L. PUCCI 2,924,135
TURNING MACHINE FOR FORMING PISTONS
Filed Sept. 13, 1957 7 Sheets-Sheet 5

INVENTOR.
Lee Pucci
ECKHOFF & SLICK
ATTORNEYS
BY
A MEMBER OF THE FIRM

Fig.17

ROUND TO OVAL AND STRAIGHT

ROUND TO OVAL AND TAPERED

OVAL TO INCREASING OVAL AND STRAIGHT

OVAL TO INCREASING OVAL AND TAPERED

Fig.24

INVENTOR.
Lee Pucci

ECKHOFF & SLICK
ATTORNEYS
BY
A MEMBER OF THE FIRM

# United States Patent Office 2,924,135
Patented Feb. 9, 1960

2,924,135

TURNING MACHINE FOR FORMING PISTONS

Lee Pucci, Castro Valley, Calif., assignor to United Engine & Machine, Incorporated, a corporation of California Application September 13, 1957, Serial No. 683,872

3 Claims. (Cl. 82—19)

This invention relates to the manufacture of pistons intended for use in internal combustion engines. Such pistons are most frequently cast of an aluminum alloy, although cast iron, magnesium and other metals are also useful.

Pistons intended for use in internal combustion engines are normally finished by grinding and turning the skirt of the piston to ensure that the piston has a predetermined diameter, relatively close tolerances being observed. It is desired that a close fit be maintained between the piston and the cylinder in which it is reciprocated to the end that the engine will operate quietly and the piston rings will have a long life. The piston changes shape as the engine becomes heated, e.g., the greater amount of heat conducted into the piston in the region of the piston pin causes a greater expansion of the piston in the region of the pin bosses. To off-set this expansion, it has been found desirable to provide the skirt of the piston with an elliptical shape, the diameter of the piston skirt measured parallel to the piston pin being smaller than the diameter measured at right angles to the pin. With a piston of an elliptical section, the piston expands from an elliptical cross section to more nearly a true circular cross section, and is in contact with the cylinder wall with a more nearly uniform bearing surface.

It has also been observed that under normal operating conditions the upper portion of the piston skirt is at a higher temperature than the bottom of the skirt. Therefore, to provide for a more uniform bearing surface contact between the piston and the cylinder wall, it is desirable to provide the piston of an overall smaller diameter at the top of the skirt than at the bottom of the skirt, e.g., the piston has a taper, being of a smaller diameter at the top of the skirt as compared to the bottom of the skirt.

It has been the practice heretofore to attain a desired piston shape by grinding the surface of the piston with an abrasive grinding wheel, the piston being contoured by having the grinding wheel follow a pre-set guiding cam surface. However, this has not proved satisfactory inasmuch as the abrasive wheel soon becomes coated with metal particles as the grinding proceeds and, as a result, the piston will have a poor finish. In addition, grinding is a relatively slow operation and production costs are therefore high. Further, the grinding must be carried on at a relatively slow rate, otherwise the grinding wheel will not follow the cam without whipping. Further, in practice, it has been found that the cost of maintenance of the cam followers and cradle bearings is relatively high.

When it has been attempted to produce pistons by turning using a cam as a guide, a poor surface finish has been attained because of the necessity of using relatively slow spindle speeds and low cutting speeds, because of the inability of the cam follower to follow the cam at high spindle speeds. The net result is that production costs have been relatively high.

The machine and process of the present invention enables a piston skirt to be turned at a very high spindle speed to provide a wide variety of combinations of various features desired on the surface of the piston. Thus, by utilizing the machine and process of the present invention, one can provide a piston having a skirt which is round and straight, round and tapered, elliptical and straight, elliptical and tapered, or one which is round at the bottom of the skirt and elliptical at the top, and being either straight or tapered, and one in which the ellipse is greater at the top of the skirt as compared to the bottom and with the skirt either straight or tapered.

The machine of the present invention includes other features of advantage; for example, it is so constructed that the cutting tool can be retracted positively at the end of the cutting cycle and returned to its starting position without dragging the cutting tool over the finished piston and so marring its surface. The machine is also capable of relatively quick set-up, only one adjustment being necessary to provide a round, an elliptical, or a progressive elliptical contour on a piston and this without the necessity of using any revolving cam or revolving cam followers. Further, only one adjustment is required to provide a taper on a piston. These features enable relatively high spindle speed to be utilized with the resulting fast production cycle to produce a better finish on the piston.

It is in general the broad object of the present invention to provide a novel machine for producing a finished surface of a desired contour on an internal combustion engine piston.

A further object of the present invention is to provide a machine which will enable a finish of a desired contour to be provided upon an internal combustion engine piston and which includes relatively simple control means which can be readily adjusted and in which the work can be cut at relatively high speed.

The invention includes other objects and features of advantage, some of which, together with the foregoing, will appear hereinafter wherein the present preferred form of a machine embodying this invention is disclosed.

In the drawings accompanying and forming a part hereof,

Figures 9 through 24 are, respectively, representations of the inner surface of the cylinder bore and of the outer surface of the piston shown schematically in Figure 25, each of the odd-numbered figures being taken along the plane represented by the line A—A in Figure 25, and each of the even-numbered figures being taken along the plane represented by the line B—B in Figure 25; the figures are to be taken in pairs, that is, for example, Figures 9 and 10, respectively, illustrate a piston which is round and has straight side walls, while Figures 11 and 12 illustrate a piston which is round and has tapered side walls, as will appear further in detail.

Figure 26:
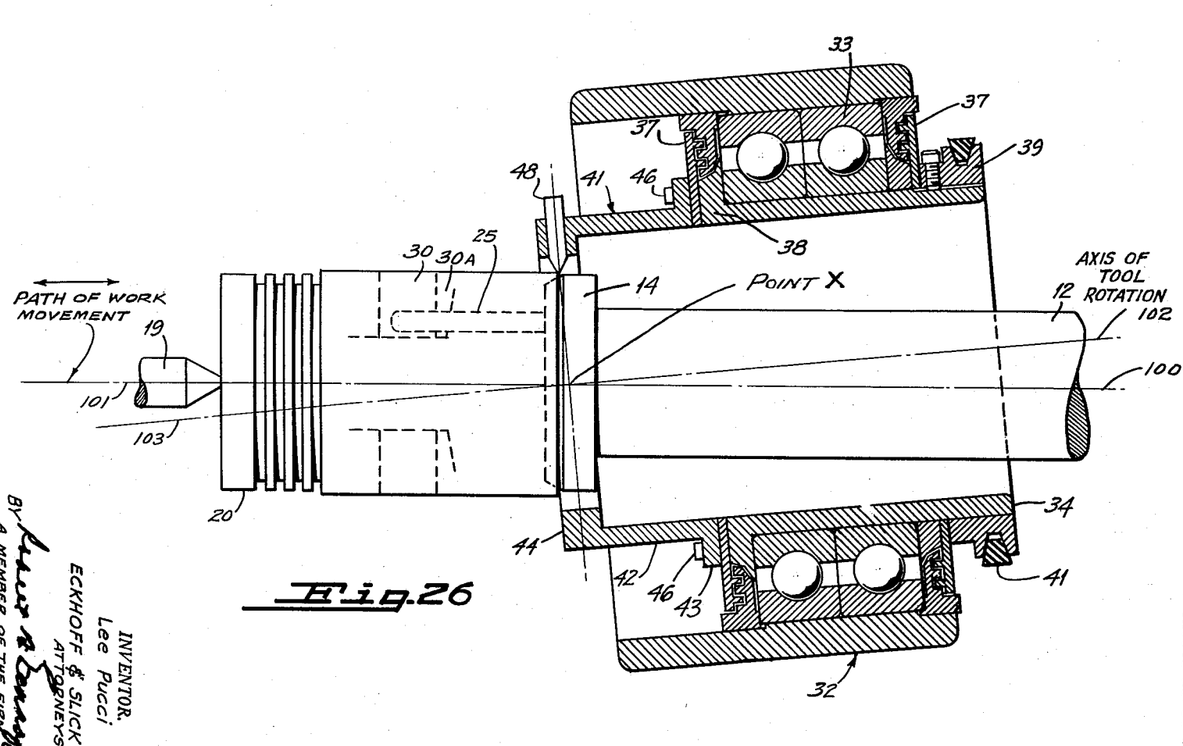
Figure 26 is a fragmentary veiw illustrating the relative paths of movement of the work and of the tool during cutting of an elliptical surface on a piston.

In the machine shown in the drawings, I have indicated at 6 a fixed machine base of suitable size, weight, and suitably supported, and having an upper planar portion 7 suitably formed to provide a sliding support for a movable base, generally indicated at 8, which is movable back and forth over a straight line path, indicated by line 100—101 of Figure 26, and which is normally horizontal. Means are provided for sliding the movable base 8 at a uniform rate with respect to the fixed base 6, but such means, in and of itself, forms no part of the present invention and has not therefore been shown since such means and the detail thereof are well-known in the machine tool art to which this invention relates. It will suffice to say that the movable base is moved from left to right in Figure 1 at a first uniform speed and is then returned to the starting position shown in Figure 1 at a second uniform speed which is generally greater than the first speed. Instead of moving the work past a tool which is fixed relative to the work, one can move the tool over a circular or a path of controlled contour while the work is held in a fixed position.

Figure 1:
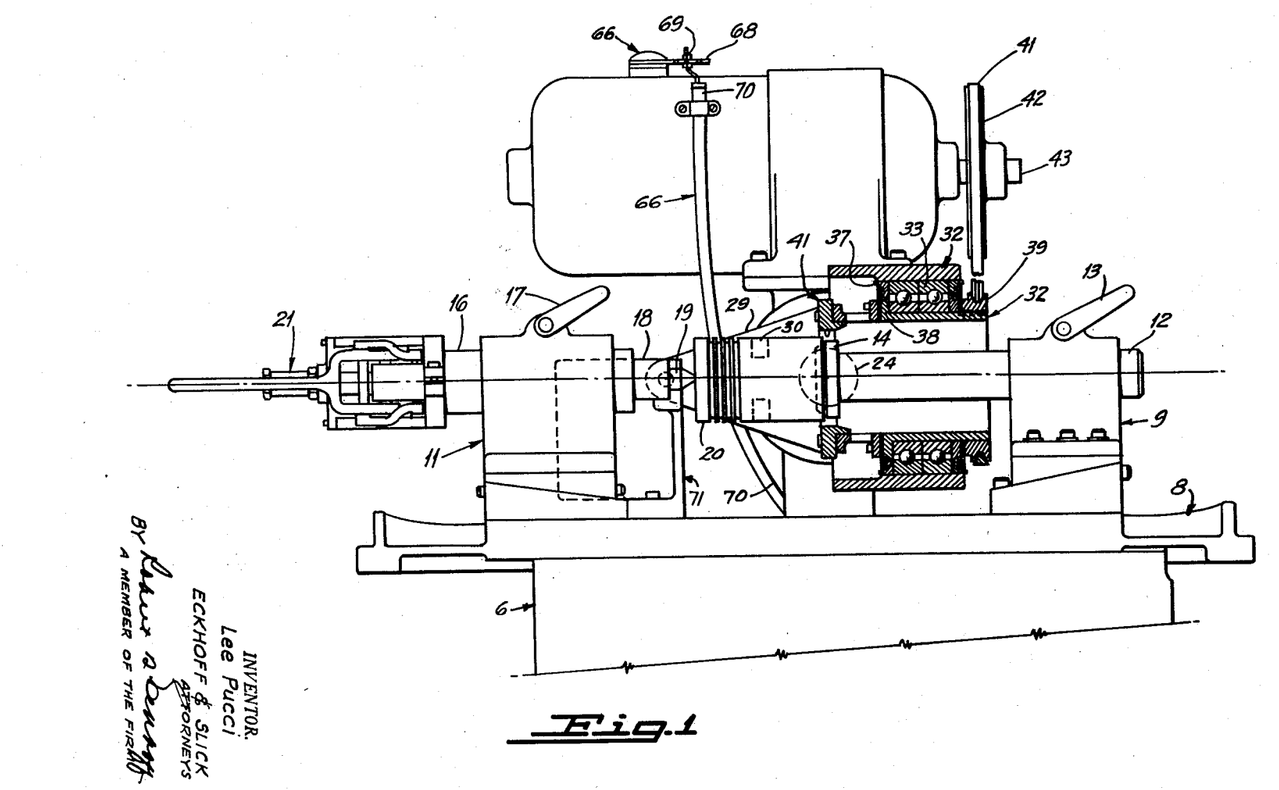
Figure 1 is a side elevation, partly in section, of an assembled machine.

A head stock, generally indicated at 9, is provided at one end of the movable base, while a tail stock, generally indicated at 11, is provided at the opposite end of the movable base. The head stock includes a piston support shaft 12 adjustably secured by clamping means 13 and having piston support means 14 provided at one end thereof to engage the skirt end of a piston 20 (Figures 1 and 26) and having a pin 25 extending to engage a boss 30A within the piston (Figure 26). This serves to maintain the correct alignment of the piston pin hole 30 (Figures 1 and 26).

Tail stock 11 includes a tubular support shaft 16 adjustably secured in position by clamping means, generally indicated at 17. The tubular shaft 16 has a slidable shaft 18 therein, carrying a center 19 for engagement with one end of piston 20, as is shown in Figures 1 and 26. Shaft 18 is moved toward and away from a piston, with a quick release or quick engagement of a piston, by means of the toggle mechanism, generally indicated at 21; the details of this toggle mechanism form no part of the present invention, and any suitable means can be provided for enabling the piston to be clamped effectively and yet quickly in fixed position, and held against rotation during the cutting operation performed upon the outer surface of the piston.

Figure 2:
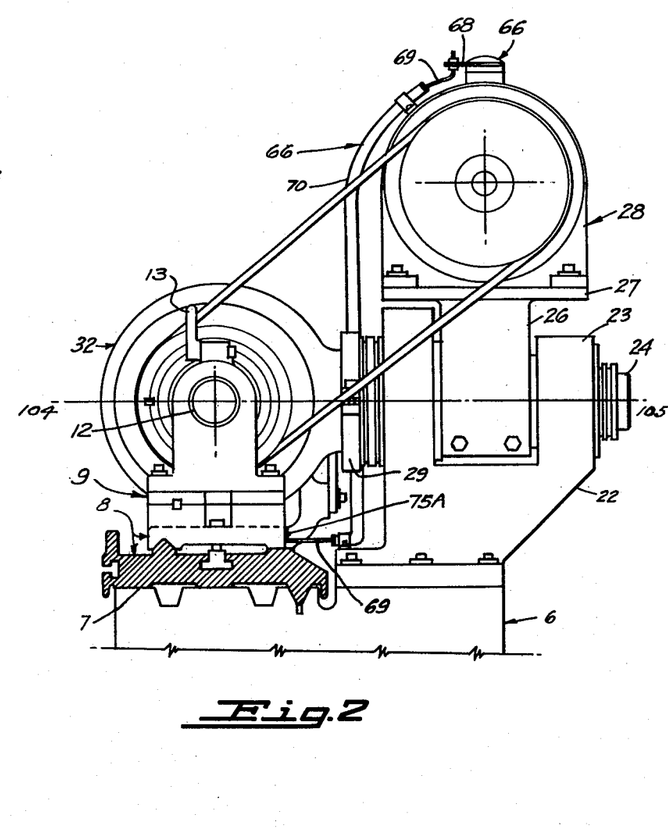
Figure 2 is an end view of the machine.
Figure 3:
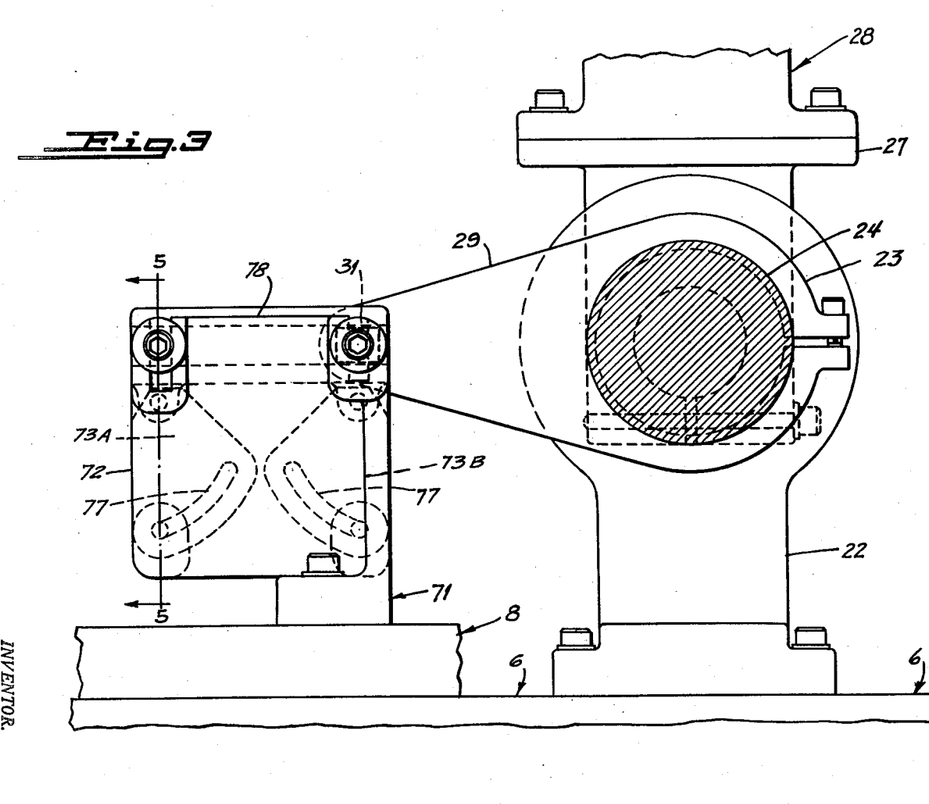
Figure 3 is a side view of a portion of the guide mechanism utilized in contouring the piston.

Referring particularly to Figure 2, a bracket 22 is secured to the fixed base 6, the bracket terminating in a pair of spaced arms 23. A shaft, generally indicated at 24, is journaled in the arms 23. Mounted on shaft 24 between the arms 23 is another bracket, 26, this having a platform 27 thereon, upon which is mounted a variable speed electric motor, generally indicated at 28. An arm 29 (Figure 3) is clamped securely at one end about shaft 24, while its other end carries a rotatably mounted slide block 31.

Mounted on the shaft 24 is a tool holder, generally indicated at 32 (Figures 1, 2 and 26), and having bearings 33 therein, these providing a support for a cylinder 34 extending on each side of the bearings 33, the latter being retained in place and sealed by retaining and sealing means, generally indicated at 37. Cylinder 34 includes a flange 38 at one end resting against one of the bearings 33, while at its opposite end a V-belt sheave 39 is mounted on the end of the cylinder, a belt 41 being trained about this sheave and about a sheave 42 on shaft 43 of electric motor 28.

Figure 6:
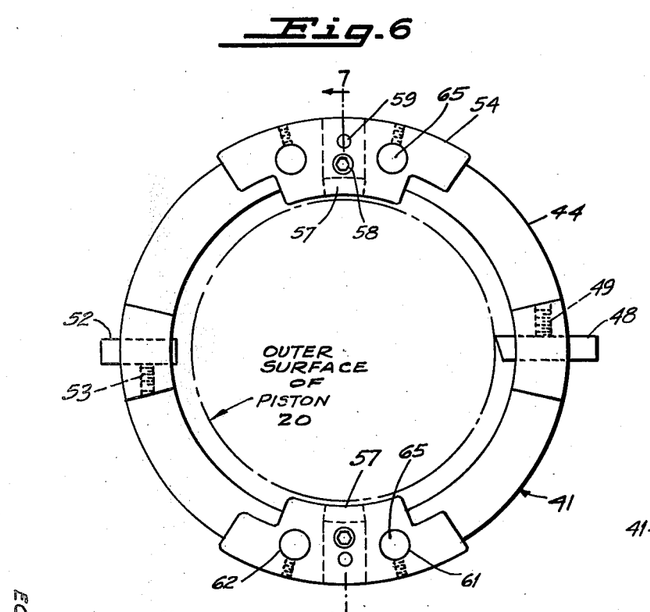
Figure 6 is a plan view of the cutting tool employed.
Figure 7:
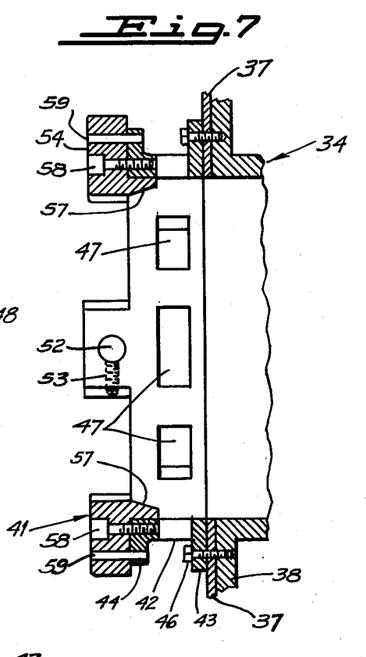
Figure 7 is a section taken along the line 7—7 in Figure 6.
Figure 8:
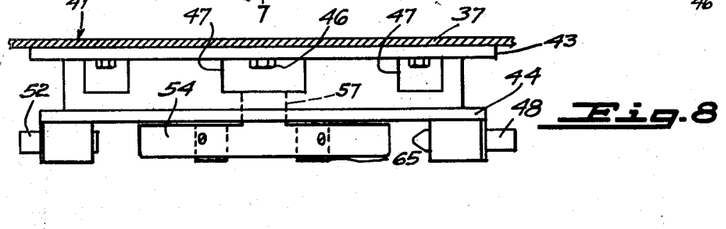
Figure 8 is a plan view of the tool shown in Figure 6.

Referring particularly to Figures 6, 7 and 8, the cylinder 34 has a cutting tool mechanism, generally indicated at 41, secured thereto. This cutting tool mechanism forms an important part of the present invention; it comprises a cylindrical shell 42 having flanges 43 and 44 thereon, the former being secured by studs 46 to the flange 38 on the cylinder 34. The cylindrical shell 42 includes a plurality of cut-out portions 47 symmetrically disposed about the periphery thereof. The cut-out portions coact with the shell 42 and the cylinder 34 to draw air positively over a work piece during cutting, enabling this to be cut dry and yet remain cool.

A suitable cutting tool, generally indicated at 48, is retained in portion 42 by a screw 49 in position for cutting the surface of a piston, the latter being diagrammatically indicated at 20 in Figure 6; the inside diameter of the cylinder 34 and the cutting tool mechanism 41 are each such that a piston will pass freely within them and in cutting relation to the tool 48. Opposite the cutting tool 48, a counter-balancing weight 52 is provided, this being retained in place by screw 53, the weight 52 and the cutting tool 48 being diametrically opposite one another.

Mounted opposite to one another and normal to the cutting tool 48 and its counter-balance 52, are cylinder deforming weights, generally indicated at 54, which extend for some distance along and in spaced relation to the outer periphery of flange 44, each weight including a projecting lip 57 on the underside thereof. Each of the weights is retained in place by a stud 58 and a dowel pin 59 in radial alignment. It is to be noted that the area of contact of each of the weights 54 with the flange 44 is restricted to an area corresponding to the width of the lip 57 and the inner face of each of the weights immediately above the lip 57, as appears in Figure 8. This limited area enables the weights to deform the tool holder 41 to an extent having a relation to the speed of rotation. Thus, the position of the cutting tool 48 relative to the surface of the piston 20 can be varied by varying the speed of rotation of the cutting tool. The shell 42 is usually made of a flexible mild steel. Operating at speeds between 1,500 and 2,500 r.p.m., for example, I have had no difficulty whatsoever in controlling and varying the relative position of the tool for a given setting by merely varying the speed of rotation of the tool. If the tool support proves to be too stiff, more material can be removed by enlarging the symmetrically disposed cut-away portions 47.

By adding counter-weights 65, as in the receptacles 61 and 62, in each of the peripheral weights 54, the tool support can be further deformed in a controlled manner. It is preferred that the counter-weights be provided at substantially 90° to the tool and its counter-weight since this enables one to move the tool inwardly merely by increasing the speed of rotation. The amount of movement of the tool for a given change in speed can be varied by altering the counter-weights, e.g., one can use tubular weights or weights made of plastic, wood, steel, brass or lead. In this manner, one can continue the tool position and can adjust the tool position positively and accurately to effect a change of as little as 0.0001 of an inch.

If the counter-weights are provided in the same plane with the cutting tool, then the tool will move away from the work as the tool is rotated and as the speed of rotation is increased. In cutting a piston, this is not as desirable as is positive movement of the tool toward the work with rotation.

By varying the speed of rotation of the tool, one can provide more or less taper upon the piston as this is moved relative to the cutting tool. This is effected by suitable control means and including speed varying means for the motor, generally indicated at 66, such means including an extending arm 68 moved by a wire 69 extending from fixed tubular wire support 70, which is fixed in position on the motor and on the fixed base with one end of the wire attached to the movable base 8 as at 75A, and the other end attached to the arm 68. The wire is moved proportionally to the travel of the cutting tool over that portion of the surface of the piston to which it is desired to impart taper. Thus, for example, the tool can be operated, say, at 1500 r.p.m. when it is at one end of the piston; the speed is uniformly increased as the tool is moved over the surface of the piston until the tool is turning at 2500 r.p.m. at the other end of the surface to be tapered.

To impart an elliptical shape to the piston as desired during the cutting operation, the end of arm 29 is suitably moved to vary the plane of rotation of the tool holder 41 as it moves over the piston. Such movement is about the axis 104—105 of shaft 24 so that the tool rotates about an axis 102—103 which is at an acute angle to the path of work movement, as represented by line 100—101 (Figure 26); such movement is also about an axis parallel to the plane of rotation of the tool holder. To this end, a fixed support 71 is provided upon the movable base 8, as appears in Figures 3–5. Mounted upon the fixed support 71 is a plate structure 72 having a pair of right and left-hand adjusting means 73 mounted thereon, such adjusting means being in the form of generally quadrant shaped plates 73A and 73B, each hinged at one end by a stud 74 and adjustably secured in place by a stud 76 fitting in a slot 77. Resting upon the upper ends of each of the adjusting means 73 is a slide block plate 78, the latter being adjustably secured by studs 79 (Figure 5) fitting in slots 80 on plate 72. Each of the adjusting plates 73 includes suitable indicating means 81 provided upon the plate 72 so that a plate 73 can be returned to a given position of adjustment, as desired.

Figure 9:
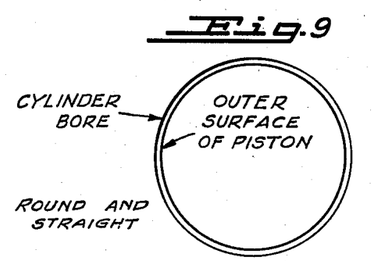
Figure 10:
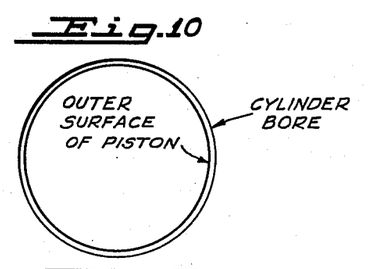
Figure 11:
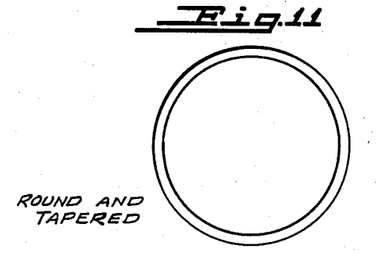
Figure 12:
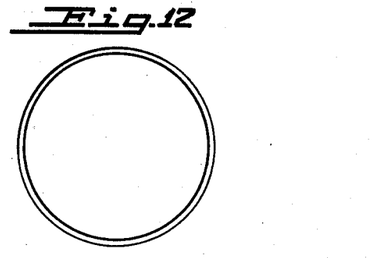

The position of the adjusting means is varied to alter the position of the slide block plate 78 and so vary the movement of the tool holder 41 as it moves back and forth over the piston. For example, with the slide block holder 78 in that position in which it appears in Figure 4, the tool is moved over a path parallel to the longitudinal axis of the piston; in this adjustment, path 100—101 and axis 102—103 coincide in Figure 26. If the speed of rotation of the tool is constant, the piston will be formed with straight sidewalls; a piston having this configuration is represented in Figures 9 and 10. If, however, the speed of rotation is increased as the tool is moved over the piston, that is, from the bottom of the piston toward the head, then the piston will be round and will be tapered with the bottom edge of the skirt of a larger diameter than the diameter adjacent the head of the piston, as appears in Figures 11 and 12.

Figure 13:
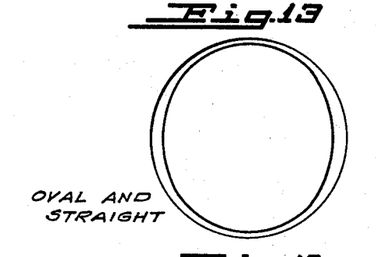
Figure 14:
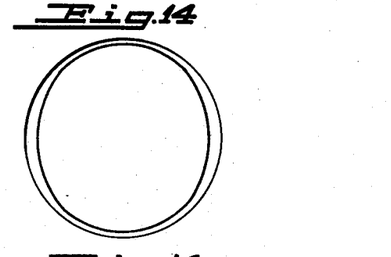
Figure 15:
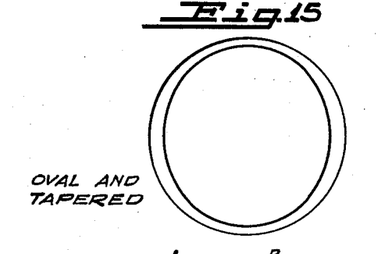
Figure 16:
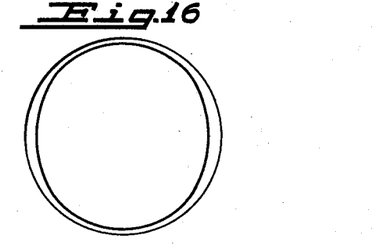

If the slide block is lowered uniformly and the speed of rotation is not changed, then the piston will be of oval shape with straight sidewalls, as is represented in Figures 13 and 14. In this case, the work will travel over the path 100—101 in Figure 26, while the axis 102—103 about which the tool rotates will be at an acute angle to the path over which the work moves. If the speed of the motor is increased, however, as the tool approaches the head end of the piston, then the piston will be oval and tapered, as in Figures 15 and 16.

Figure 4:
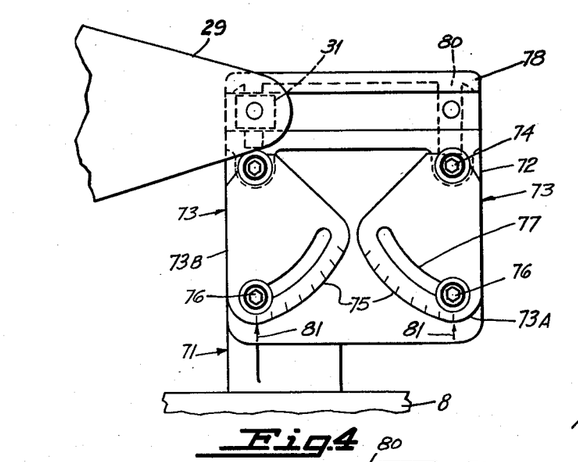
Figure 4 is another side view, showing a portion of the guide mechanism for contouring the piston.
Figure 5:
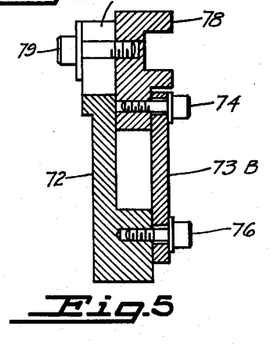
Figure 5 is a section taken along the line 5—5 in Figure 3.

The degree of oval imparted to the piston represented by Figures 13–14 and Figures 15–16 is such that the variations from the circular section are uniform; this is effected by lowering both plates 73A and 73B uniformly so that the slide block plate 78 is parallel to that position in which it is shown in Figure 4, but somewhat lower.

Figure 17:
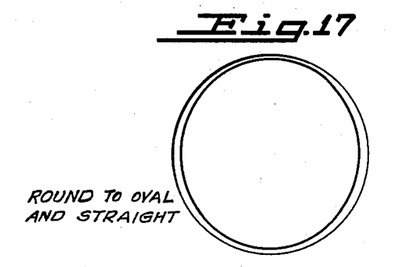
Figure 18:
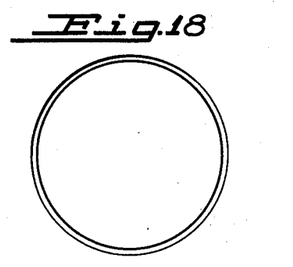
Figure 19:
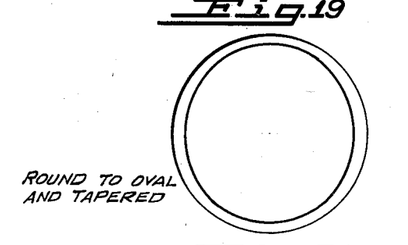
Figure 20:
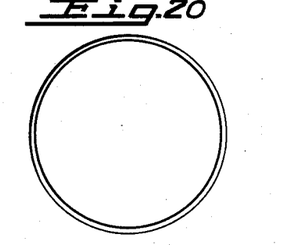

If one lowers the plate 73A and retains plate 73B in the position in which it is shown in Figure 4, then the piston will be round at the bottom end of the skirt and will have an oval section near the top, as is indicated in Figures 17 and 18. If the speed of the motor is increased, then the piston will, in addition, be tapered, as indicated in Figures 19 and 20.

Figure 21:
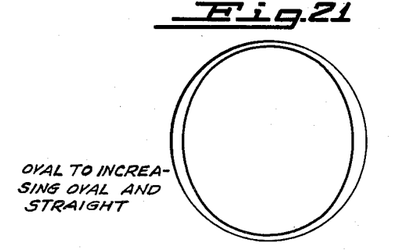
Figure 22:
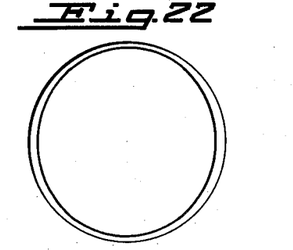
Figure 23:
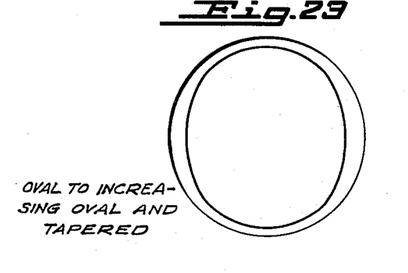
Figure 24:
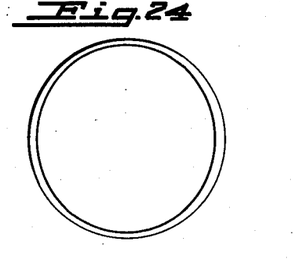
Figure 25:
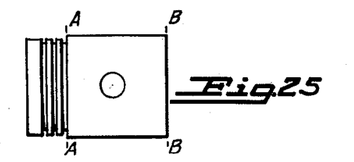

If both plates 73A and 73B are lowered but 73A is lowered slightly more than 73B, then the amount of oval imparted will be greater adjacent the top of the piston than at the bottom of the skirt. If the motor speed is not altered, the piston sidewalls will be straight, as is indicated in the piston depicted in Figures 21 and 22. If, however, the motor speed is altered, then a taper can be imparted to the piston, as has been indicated in Figures 23 and 24.

When the cutting tool reaches the end of its cutting travel, it is only necessary to stop the rotation of the tool to retract it from engagement with the piston surface as the movable base 8 is returned to its starting position. This can be done automatically and as part of the control of the motor.

From the foregoing, I believe it will be apparent that I have provided a relatively novel and simple and improved machine for imparting any desired shape or configuration to the skirt of a piston, and particularly a machine which enables a piston to be provided with an acceptable outer surface contour and finish and by relatively simple mechanical means.

The machine of the present invention enables surfaces to be provided which are defined as a "compound ellipse," that is, the major axis of the elliptical surface is of the same diameter throughout the length of the piston while the minor axis varies and structures having this construction are shown in Figures 17–18, and 21–22. To achieve this, it is necessary that the plane of rotation of the cutting tool be turned about an axis which is normal to a plane containing the path-of-work movement and the axis of tool rotation and passes through the point of intersection of the path-of-work movement and the axis of tool rotation; more specifically, and referring particularly to Figure 26, it will be noted that the path of work movement 100–101 and the axis of tool rotation 102 and 103 define a plane which corresponds to the surface of the sheet upon which Figure 26 appears. The legend "Point X" has been placed upon Figure 26, this point corresponding to the axis of shaft 24. The axis of shaft 24 passes through Point X and is normal to the plane containing the path-of-work movement 100–101, and the axis of tool rotation 102–103. The machines of the prior art are of such construction that pistons having a compound ellipse cannot be obtained. For example, with the machine shown in Patent 2,121,934, one can obtain a piston having an elliptical shape, but because the axis about which the plane of tool rotation is rotated is parallel to the plane containing the path-of-work movement and the axis of tool rotation (the surface of Sheet 4 of the drawings in Patent 2,121,934) instead of being normal to such plane, the piston lacks a true compound elliptical surface.

This application is a continuation-in-part of my application Serial No. 420,933, filed April 5, 1954, now abandoned.

I claim:

1. A machine for generating an elliptical surface around the axis of a piston or the like comprising means for holding the piston against rotation, means for moving the piston and a tool holding cage relative to each other along the axis of the piston, a rotatable, tool holding deformable cylindrical cage, said cage having a single, inwardly directed, pointed cutting tool on the periphery of the cage, a counter weight on the periphery of the cage diametrically opposed to said cutting tool, diametrically opposed weights on the periphery of the cage offset from said tool and said counter weight, and means for rotating said tool holding cage whereby centrifugal force acting on said opposed weights as the cage is rotated causes said cage to become distorted, and to decrease the diameter of the cutting path described by said pointed tool, means for rotating the cage on a first axis of rotation whereby the point of the cutting tool describes a circle lying on a plane and is in cutting engagement with the piston, means for rotating said first axis about a second axis perpendicular to said first axis, said second axis passing through the point of intersection of the plane of tool rotation and the axis of the piston, said second axis also being normal to the plane defined by the axis of the piston and the first axis of rotation when the first axis is rotated about the second axis, and cam means for rotating said cage around the second axis as the piston and tool holding cage are moved relative to each other.

2. A cutting tool assembly comprising a rotatable, tool holding deformable cylindrical cage, said cage having a single, inwardly directed, pointed cutting tool on the periphery of the cage, a counter weight on the periphery of the cage diametrically opposed to said cutting tool, diametrically opposed weights on the periphery of the cage offset from said tool and said counter weight, and means for rotating said tool holding cage whereby centrifugal force acting on said opposed weights as the cage is rotated cause said cage to become distorted, and to decrease the diameter of the cutting path described by said pointed tool.

3. The tool holding cage of claim 2 wherein each of the opposed weights extend around the periphery of the cage for a substantial distance and is connected with the cage at only a single pivot point, whereby each weight exerts force against the periphery of the cage at only a single point.

References Cited in the file of this patent

UNITED STATES PATENTS

| | | |
|---|---|---|
| 1,710,016 | Dall | Apr. 23, 1929 |
| 2,116,262 | Granberg | May 3, 1938 |
| 2,121,934 | Snader | June 28, 1938 |
| 2,131,327 | Lippard | Sept. 27, 1938 |
| 2,651,832 | Menard | Sept. 15, 1953 |
| 2,739,818 | Benjamin | Mar. 27, 1956 |